United States Patent
Matsushita et al.

[11] 3,860,325
[45] Jan. 14, 1975

[54] ELECTRIC FIELD DISPLACING TYPE OPTICAL ISOLATOR

[75] Inventors: Shigeo Matsushita; Toru Sumimoto; Teiji Uchida, all of Tokyo, Japan

[73] Assignee: Nippon Electric Company, Limited, Tokyo, Japan

[22] Filed: June 26, 1973

[21] Appl. No.: 373,658

[30] Foreign Application Priority Data
June 30, 1972  Japan.............................. 47-66091

[52] U.S. Cl. ........................... 350/96 WG, 350/151
[51] Int. Cl. .............................................. G02b 5/14
[58] Field of Search .............................. 350/96 WG

[56] References Cited
UNITED STATES PATENTS
3,659,916   5/1972   Marcatili ..................... 350/96 WG OTHER PUBLICATIONS
Wang et al., "Studies of Magnetooptic Effects for Thin-Film Optical-Waveguide Applications" IEEE, Transactions On Magnetics, Vol. Mag-7, No. 3, Sept. 1971, pp. 385-387.

*Primary Examiner*—John K. Corbin
*Attorney, Agent, or Firm*—Hopgood, Calimafde, Kalil, Blaustein & Lieberman

[57] ABSTRACT

A novel electric field displacing optical isolator usable in integrated optical circuits includes a dielectric light guide formed adjacent to and in parallel with the surface of a dielectric substrate and a thin film of magnetic material mounted adjacent to the light guide. The thin film is magnetized in a direction parallel to the substrate surface and perpendicular to the direction of desired light transmission within the light guide.

2 Claims, 7 Drawing Figures

ELECTRIC FIELD DISPLACING TYPE OPTICAL ISOLATOR

BACKGROUND OF THE INVENTION

This invention relates to optical isolators and more particularly to an optical isolator suitable for use in optical integrated circuits.

In recent years, developments in the field of optoelectronics have been greatly accelerated and, as a result, attempts have been made to develop integrated optical circuits which correspond to integrated electrical circuits. The fundamental techniques in the development of optical integrated circuits were proposed by S.E. Miller in a paper published in "The Bell System Technical Journal," September, 1969, pp. 2059–2069. Such an integrated optical circuit would require an optical isolator.

Prior art optical isolators in the light wave region utilized the so-called Faraday effect. The Faraday effect is a property of transparent substances by which the plane of polarization of light is rotated when the light is propagated through a magnetic material in a direction parallel to a magnetic field applied to the material. It is not practical to use the Faraday effect in an optical isolator intended for use in an integrated optical circuit, since, a part of the light guide portion of the integrated optical circuit of a fine circuit pattern would have to be formed of a magnetic material. In addition, the Faraday effect requires that a magnetic field must be established along the direction of the light wave transmission and this requirement would result in a complicated structure which would be extremely difficult to construct in the limited space available in integrated optical circuits.

In contrast, the electric field displacing type optical isolator of the present invention utilizes a magnetic thin film which is suitable for use in integrated optical circuits, since the magnetic thin film can be easily produced in any desired pattern or dimension by evaporation onto a surface.

OBJECT OF THE INVENTION

Accordingly, it is the object of the present invention to provide a novel optical isolator free from the above described disadvantages which is suitable for use in optical integrated circuits.

BRIEF SUMMARY OF THE INVENTION

The optical isolator of the present invention comprises a dielectric substrate, a dielectric light guide member formed adjacent to and in parallel with a surface of the dielectric substrate and a thin film of a magnetic material formed adjacent to the dielectric light guide member. The thin film of magnetic material is magnetized in a direction perpendicular to the desired direction of the transmission of light rays in the light guide member and parallel to the dielectric substrate surface.

BRIEF DESCRIPTION OF THE DRAWINGS

FIG. 1b is a diagram of the electric field distribution in the device shown in FIG. 1a;

DESCRIPTION OF THE INVENTION

The principle of the present invention is based on the phenomenon that the virtual refractive index of a magnetic thin film varies depending upon the direction of the magnetization of the thin film and the direction of rotation of the magnetic fields of light rays propagating in the film. The direction of rotation of the light wave magnetic field is in turn dependent on the direction of propagation of the light wave. Because of this phenomenon the electromagnetic field distribution of the light rays within a light guide having a suitably magnetized magnetic thin film formed adjacent to it will differ depending on the direction of transmission of light rays in the light guide due to the different virtual refractive indices exhibited by the thin film for light rays propagating in different directions. If a portion of the light guide is formed of a light absorbing medium, the light absorbing portion can be arranged so that the light rays traveling in one direction in the light guide will be mostly absorbed, whereas those traveling in the opposite direction will suffer only slight absorption and will be transmitted without being appreciably attenuated.

For the convenience of explanation, the displacement of the electromagnetic field distribution within a dielectric light guide portion which is ascribable to the presence of a magnetic thin film magnetized in a direction perpendicular to the transmission direction of light rays will be described with reference to FIG. 1.

Figure 1A:
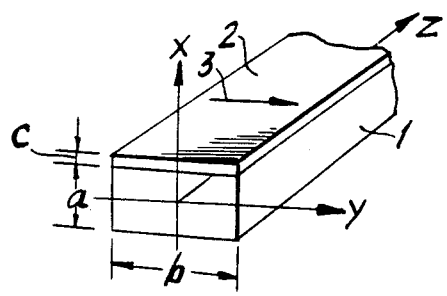
FIG. 1a is a perspective view of a light guide member of the type disclosed in this invention.

In FIG. 1a, reference numeral 1 denotes a dielectric light guide portion of cross-sectional area ($a \times b$). A magnetic thin film 2 is magnetized in the direction of arrow 3 and has a thickness of $c$. Letters $x$, $y$ and $z$ denote the Cartesian coordinates of the system. Assuming that light rays having a plane of polarization parallel to the $yz$ plane are propagating in the light guide 1, the magnetic fields of the light rays are rotating about axes parallel to the $y$-axis and at arbitrary points on both sides of the $yz$ plane. Some of the magnetic fields are on the side of the $yz$ plane on which the magnetic thin film is provided and some are on the opposite side. In addition, light rays propagating in the positive direction along the $z$-axis and those propagating in the negative direction along the $z$-axis have magnetic fields with opposite directions of rotation. The magnetic thin film 2 is magnetized in the direction perpendicular to the direction of propagation of the light rays and varies in its virtual refractive index depending on the direction of rotation of the magnetic field of the propagating light ray. More specifically, when a given magnetic field is rotating in the direction of right-hand screw with respect to the direction of the magnetization indicated by arrow 3, the virtual refractive index of the magnetic thin film becomes low. This rotating field is here defined as positive. In the cases where the magnetic field is rotating in the opposite or negative direction, the effective refractive index of the magnetic thin film 2 becomes high. Accordingly, light rays propagating in the positive direction along the $z$-axis produce positive rotating field within the magnetic thin film 2 and a low virtual refractive index in the thin film so that the electromagnetic field distribution of such a ray is inclined towards the negative direction of the $x$-axis. On the other hand, the light rays propagating in the negative direction of the $z$-axis and generating negative rotating fields within the magnetic thin film 2 result in an electromagnetic field distribution which is inclined towards the positive direction of the x-axis.

Figure 1B:
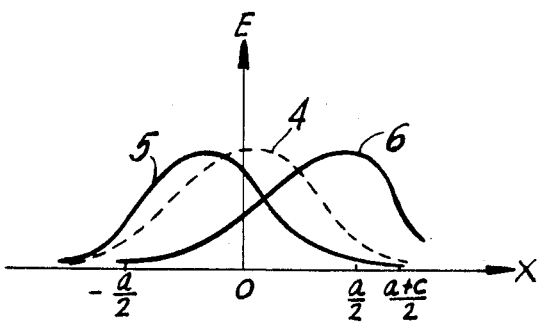

FIG. 1b illustrates various states of displacement for the electric field distribution. Dotted line 4 denotes the electric field distribution for the case where the magnetic thin film is not present, while solid lines 5 and 6 denote the electric field distribution for light rays propagating in the positive and negative directions along the z-axis, respectively.

If the magnetic thin film 2 also exhibits a light absorbing property, the light rays will be propagated in the positive direction along the z-axis, with substantially no attenuation, since their electromagnetic fields are concentrated below the yz plane and away from the absorbing thin film. The light rays propagating in the negative direction on the other hand will have most of their energy absorbed in propagation because of the concentration of their electromagnetic fields above the yz plane and into the light absorbing magnetic thin film 2. So that, insofar as the plane containing the polarization plane of the propagating light rays or a plane defined by the electric field component and the propagation direction is held parallel to the magnetic thin film, the degree of attenuation of light rays will differ greatly depending on the direction of the propagation of the light rays, permitting the device to function as an optical isolator.

Figure 2:
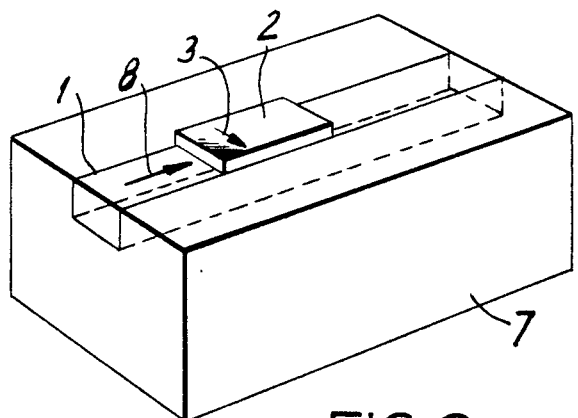
FIG. 2 shows a first embodiment of the invention.

A first embodiment of the novel optical isolator is shown in FIG. 2, and includes a glass substrate 7, a light guide 1, formed in the glass substrate and a thin magnetic film 2 formed on the surface of the light guide 1. Arrow 3 indicates the direction in which film 2 is magnetized and arrow 8 indicates the propagation direction of the incident light rays. The cross-sectional dimensions of the light guide 1 are chosen so that only the fundamental mode of the incident light wave is transmitted.

The various parts of FIG. 2 can for instance have the following parameters. The glass substrate 7 can have a refractive index of $N=1.615$. The light guide 1 can have a refractive index of $n=1.620$, and the width and thickness of the light guide can be respectively 2 microns and 0.5 micron. The ferromagnetic thin film 2 can be formed of $FeF_3$ film by evaporation, and can have a thickness of about 0.3 micron with the evaporated face lying in the (111) plane. As reported in a paper by R. Wolfe et al. in "Journal of Applied Physics" March, 1970, pp. 43 through 45, the ferromagnetic substance $FeF_3$ is an optically excellent magnetic material usable at room temperatures having a refractive index of 1.54 and an absorption coefficient of 4.4 $cm^{-1}$. The easy axis of magnetiztion for this material lies within the (111) plane.

Assuming that the light is propagating through the light guide 1 in FIG. 2 in the direction of arrow 8 having a plane of polarization which is parallel to the plane of thin film 2, the electric field distribution of the light rays will be displaced toward the side of the light guide 1 opposite to the thin film 2. This will allow the light rays to pass through the light guide 1 in this direction with little absorption by the light absorbing thin film 2. On the other hand, any reflected light rays traveling in the direction opposite to that of arrow 8 will have the greater part of their electric field distribution displaced towards the thin film 2, so that the energy of these light rays will be absorbed in the film 2 as described above.

Thus, an optical isolator is provided capable of transmitting light rays in one direction while intercepting those light rays traveling in the opposite direction.

In order to achieve the optical isolator action as described above, a polarizing means which is not shown, is required to orient the plane of polarization of the input light rays in a plane parallel to the plane of the film 2. Normally, however, output light from a semiconductor laser will provide the input light for the optical isolator. Since the output light rays of the general semiconductor laser, are polarized in the TE mode the polarizing means can usually be dispensed with.

Figure 3A:
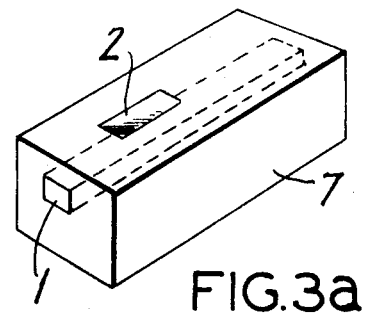
FIGS. 3a, 3b and 3c show additional embodiments of the invention.
Figure 3B:
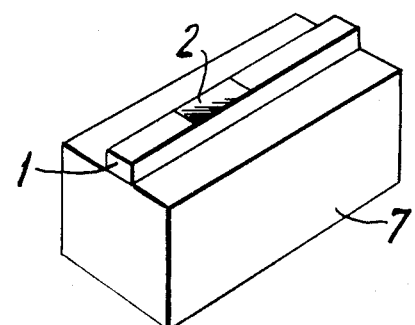
Figure 3C:
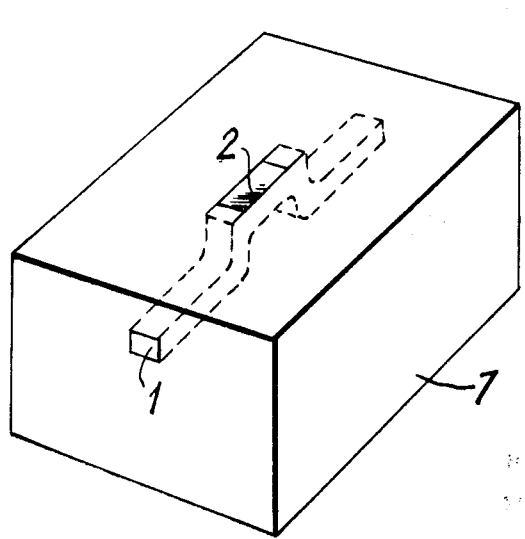

FIGS. 3a, 3b and 3c show additional embodiments of this invention. In all of these figures, reference numeral 7 denotes a transparent dielectric substrate; number 1 is a dielectric light guide; and number 2 is a ferromagnetic thin film which is magnetized in a direction perpendicular to the propagating direction of the incident light rays.

In FIG. 3a the light guide 1 is provided in the interior of the dielectric substrate 7 at a depth such that the electric field displacing action of the ferromagnetic thin film 2 is effective. In FIG. 3b the light guide 1 is formed on the surface of the dielectric substrate 7. In the embodiment of FIG. 3c, that part of the light guide 1 at which the ferromagnetic thin film 2 is formed extends to the surface of the dielectric substrate 7.

Figure 4:
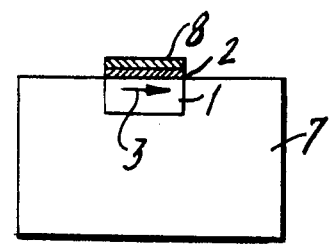
FIG. 4 shows an additional embodiment of the invention.

A fifth embodiment of this invention is shown in FIG. 4, which includes as in prior embodiments, a glass substrate 7; a light guide 1, and a thin film 2 magnetized in the direction of arrow 3. In addition, a resistance body 8, such as a metal film, is formed on film 2. Light rays propagating through the light guide 1 in the direction perpendicularly downward into the drawing of FIG. 4 have an electric field distribution which is inclined toward the side of the light guide opposite to the thin film 2 at that part of the light guide 1 at which the thin film 2 is disposed. Light rays propagating in that direction are allowed to travel through the light guide 1 with little absorption. On the other hand, light rays propagating in the opposite direction that is perpendicularly outward from FIG. 4 have their electric field distribution displaced towards the thin film 2 as stated hereinabove. These light rays are efficiently absorbed by both the thin film 2 and the resistance body 8, and are thereby intercepted. The additional provision of the resistance body 8 provides an optical isolator which is even more efficient in intercepting the light rays traveling in a direction opposite to the desired direction.

As can be readily seen the optical isolator of the present invention includes many advantages. The light guide and the magnetic thin film need not be in physical contact simplifying the necessary manufacturing steps. The magnetic thin film can be provided by utilizing conventional techniques for electrical integrated circuits. Since magnetic materials generally have large absorption coefficients in the light region, the thin film can provide both electric field displacement and light absorption.

While the principles of the invention have been described in connection with specific apparatus, it is to be understood that this description is made by way of example and not as a limitation to the scope of the invention. For instance, although the above embodiments disclose light guides of rectangular cross section and a suitable thin film of a ferromagnetic substance, it is to be understood that the light guide may be of other configurations and may have a refractive index distribution gradually decreasing from the central part towards the periphery in its cross section. The light guide is also not restricted to a single mode light guide means, but may include a multiplex mode transmission light guide as well. The thin film may consist of any ferromagnetic substance or of any magnetic substance accompanied by magnetic field applying means.

What is claimed is:

1. An electric field displacing optical isolator comprising: a dielectric substrate, a dielectric light guide for transmitting light rays, at least a part of said dielectric light guide being adjacent to a part of a surface of said dielectric substrate and in parallel with said substrate surface, a thin film of magnetic material provided adjacent to said part of said light guide; said thin film of magnetic material being magnetized in a direction which is parallel to said substrate surface and perpendicular to the transmission direction of said light rays within said light guide, and a resistance body capable of absorbing light rays, said resistance body being provided adjacent to said part of said light guide.

2. An optical isolator as claimed in claim 1, in which said resistance body is mounted in contact with said film of magnetic material.

* * * * *